6354X
T. Sutton,
Rotary Pump,
Patented Jan. 28, 1831.
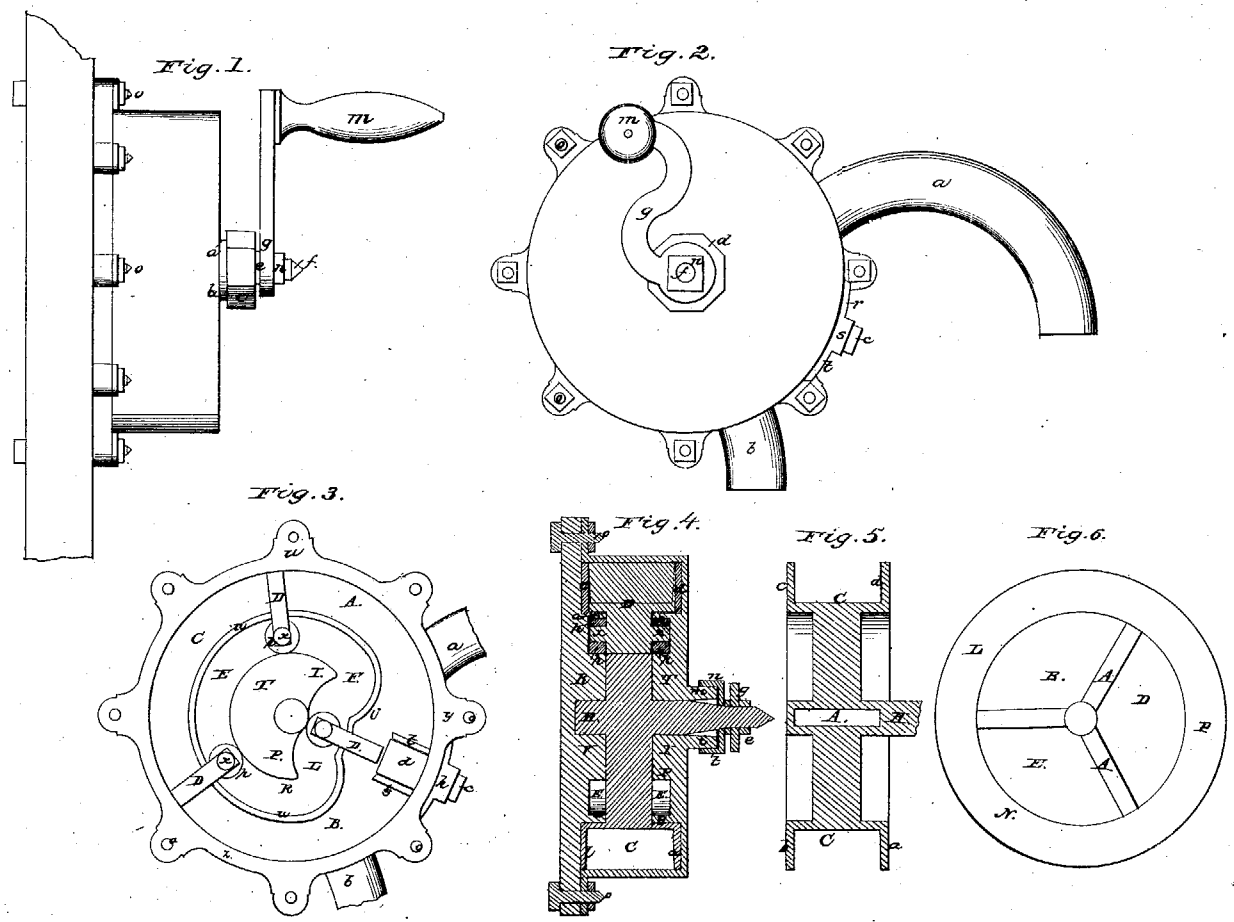
N. PETERS, PHOTO-LITHOGRAPHER, WASHINGTON, D. C.

6354X Thomas Sutton of Norwich Connecticut

Letters Patent

The Schedule referred to in these Letters Patent and making part of the same containing a description in the words of the said Thomas Sutton himself of his improvement in the machine called "Suttons Rotary Pump"

Know all men by these presents that I Thomas Sutton of Norwich in the County of New London and State of Connecticut. have invented a new and useful improvement called "Suttons Rotary Pump" the principle of which improvement may also be applied to steam and other purposes + that the following is a full and exact description of the construction and operation of the said improved machine. reference being had in the following Specification to drawings accompanying and marked "Drawings No 1." Fig 1. represents an edge view of the pump attached vertically to a plank o.o.o.o.o bolts which fasten together the front and back casings m q. the crank and handle. a.b. the packing box. c. d the cap to the packing box. e f. the arbour or shaft. n.h nut fastening the crank on the shaft or arbour. Fig 2. Is a front view of the pump b. is the inlet of the water or other fluid a. the outlet o.o.o.o.o.o the bolts to confine the two parts of the case together. q the crank m the handle to the crank of the shaft or arbour. n the nut d. the cap to the packing Box r.d.l represent a projection on the outside of the pump either cast with the pump or attached permanently with screws to the outside + connected with part d (fig. 3d.) c is a nut attached to a screw passing through this projection and connected with the moveable part d (fig 3). Fig. 3. is a vertical section of the pump shewing an inside view of one of the casings. u.y.z. show the outside front case or frame fastened to the back case by bolts - o.o.o.o.o b the inlet of the fluid. a. the outlet. A.B.C. the lower surface of one of the casings of the Pump. D.D.D. are three valves or slides as represented in fig 4. D p. a friction Roller by the axis K (as fig 4). E.F.L.R. a rise or elevation from the lower surface E.F. R is a groove formed by the elevations or raised parts w.v.w and I.T.P. both equally raised from the part E.F.L.R. The first projection from the lower surface A.B.C. to the elevation E.K.L.F. is the precise width of the flanches or projecting sides of the wheel are represented a. b.c.d. figs (4 & 5) and the elevations u.v.w. and I.T.P. correspond with the cavity in the body of the wheel E.B.D. fig 6. s.t.r. is a permanent frame attached to the case t.&s. entering the chamber and guiding and rendering firm a sliding gag d. this is pressed in by a screw connected with a nut. e and passing through the projection r. the whole t.d.s.r.e. forming a permanent bar or gag filling the space between the elevation L.R.E.F. and the case w.y.z. and between the chamber A.B.C & the wheel.

Fig 4 represents a horizontal section of the Pump passing thro its centre and cutting the shaft or arbor. a.b.c.d. represent a section of the wheel. D represents a valve sliding in a mortise in the wheel as in fig 6. A also is a groove in the flanches of the wheel. p.p.p.p. the friction roller x.x. the axes w.x.w.y. the elevations corresponding with u.v.w. in fig 3. R.V.T.I.P. the elevation represented in fig 3. T.I. P.– E.F shews the groove in fig 3. E.E.R. – C the chuck with the valve drawn to the centre. m.l. the stuffing Box n.l. cap to the stuffing-box q. the crank e.e the nut H the shaft or arbor o.o.o.o the bolts connecting the front and back casings. Fig 5. Represents the edge of the wheel standing vertically. H the shaft or arbor a.b.&c.d. the flanches or projecting sides of the wheel. The space C.C. between a.b. & c.d. forms with the case the chamber or space to transmit the water or other fluid. A the mortise cut thro the hollow part of the wheel to the shaft to receive the valve D in figs 3 & 4. Fig 6. represents one side of the wheel L.N.P. represents the outer side of the wheel corresponding in width with the space A.B.C (fig 3.) into which it runs, E.B.D. the space between the outer side L.N.P. and the shaft H is depressed to the precise elevation of u.v.w. and T.I.P above the surface A.B.C. in fig 3, A A A mortises cut into the wheel and thro it from side to side. also thro the part of the wheel at C.C. (in fig 5) to receive the sliding valve D.D.D. in fig 3.

From the foregoing description it will be seen that the wheel, and the parts of the front and back surfaces must correspond and if they do so. the relative proportion of the parts may be varied without affecting the principle. The thickness of the flanches or cheeks of the wheel may be varied also the space in the periphery of the wheel between the flanches varying at the same time the corresponding parts
in the two casings. for it will be perceived that the elevation of the second sur
face E.E.L.R above the lower surface A.B.C. as represented in fig 3. must
always correspond with the thickness of the projecting sides or flanches, of the
wheel, and that the outer rim of the wheel L.N.P. in fig 6. will fill the space
between this elevation and the outer surface. also that the space in the wheel
E.B.D is of the same depth with the elevation u.v.u. I.T.P fig 3.
above the lower surface A.B.C. so that it is necessary that this correspondence
should take place between the parts. It will also be perceived that the flanch-
es of the periphery of the wheel with the outside casing form the chamber or
space into which the water or other fluid is received and thro which it is
conducted to the outlet. The three valves each entirely fill this chamber and
form a close joint. These valves it will be perceived play into the mortises repre
sented in figs 5. & 6. also into grooves in the flanches and the motion of
them is regulated by the friction rollers, passing into the groove formed as in
fig 3. by the parts u.v.w and I.T.P. It will also be seen that on ap-
proaching the stationary bar stop or gag l.d.o.r.c fig 3. the valve is by the heart
shape of the groove drawn entirely within the wheel towards its centre and
on passing the bar passes, out and again occupies the whole chamber. The
part l. d. o.r.c fig 3. which I designate as the bar stop or gag forms a
close joint. The object of the two sides l. & o. is to regulate and render firm
the part d. This part as by the continued friction of the wheel it would
be worn away and render the joint loose has attached to it a screw connect
ed with a head on the outside with which the centre piece of the bar or gag can
be regulated at pleasure. The wheel and shaft when made of a metallic substance
is one entire casting. What I claim as my invention and for which I wish
a Patent is the peculiar construction of the wheel. the arrangement of the valves in
the wheel. and the process by which the valves are drawn to the centre of the wheel
by the heart movement. I also claim the exclusive right to the application of
these improvements, + the use of this improved machine, not only as a pump of
any size and for any kind of fluids, but as an engine for the application of steam
for propelling boats, or any other purpose.

Thomas Sutton

Witnesses { [illegible] Lathrop Jr
{ [illegible] A. Rockwell 1649 words

[illegible]